United States Patent [19]

Kahan

[11] Patent Number: 4,969,155

[45] Date of Patent: Nov. 6, 1990

[54] INTEGRATING LASER DIODE PUMPED LASER APPARATUS

[75] Inventor: Osher Kahan, Culver City, Calif.

[73] Assignee: Hughes Aircraft Company, Los Angeles, Calif.

[21] Appl. No.: 419,370

[22] Filed: Oct. 10, 1989

[51] Int. Cl.$^5$ ............................................. H01S 3/094
[52] U.S. Cl. ........................................ 372/70; 372/35; 372/75
[58] Field of Search ..................... 372/69, 70, 72, 75, 372/35, 36

[56] References Cited

U.S. PATENT DOCUMENTS

| | | | |
|---|---|---|---|
| 3,624,545 | 11/1971 | Ross | 331/94.5 |
| 3,663,893 | 5/1972 | Ostermayer, Jr. | 331/94.5 |
| 3,683,296 | 8/1972 | Scalise | 331/94.5 |
| 3,684,980 | 8/1972 | Kay | 331/94.5 |
| 3,711,789 | 1/1973 | Dierschke | 331/94.5 |
| 3,821,663 | 6/1974 | Brenner | 331/94.5 |
| 4,594,716 | 6/1986 | Guch, Jr. | 372/35 |
| 4,751,716 | 6/1988 | Ream | 372/72 |
| 4,756,002 | 7/1988 | Ruggieri | 372/70 |
| 4,764,933 | 8/1988 | Kozlovsky | 372/40 |
| 4,799,233 | 1/1989 | Jacaitis | 372/70 |
| 4,809,291 | 2/1989 | Byer | 372/75 |

*Primary Examiner*—James W. Davie
*Attorney, Agent, or Firm*—William J. Streeter; Wanda K. Denson-Low

[57] ABSTRACT

Laser apparatus comprising an integrating cavity, at least one lens and a heat sink arrangement that provides for a more uniform stored energy distribution, higher energy transfer efficiency and relaxed temperature control requirements. The laser apparatus incorporates a laser rod enclosed within a cavity. The cavity includes optically transparent heat sink means contiguous with and surrounding the laser rod. At least one laser diode array is disposed in a spaced relationship with respect to the axis of the rod. At least one lens is disposed between the diode array and the rod. The lens has a focal length and is disposed to focus light from the laser diode array onto the rod. The cavity is surrounded by reflective surfaces and is provided with at least one elongated aperture therethrough for passing light from the diode array into the interior of the reflecting cavity and onto the rod. The reflective surfaces reflect unabsorbed light passed through the rod for multiple passes through the laser rod.

21 Claims, 2 Drawing Sheets

INTEGRATING LASER DIODE PUMPED LASER APPARATUS

BACKGROUND

The present invention relates to diode pumped lasers and in particular to a diode pumped high power laser incorporating lenses disposed between the laser diodes and a laser rod, and including a diffused reflecting cavity pump to provide higher efficiency, reduced temperature sensitivity, and more uniform gain distribution.

Various arrangements and structures for increasing the efficiency of energy transfer from an array of laser diodes to a laser rod have been proposed. For example, U.S. Pat. No. 3,683,296 to Scalise discloses a structure incorporating linear arrays of laser diodes which pump energy into a laser rod surrounded by a reflective enclosure. U.S. Pat. No. 3,684,980, to Kay teaches a structure which incorporates a linear array of laser diodes and a reflective pump cavity. Other patents such as U.S. Pat. No. 4,594,716 to Guch, Jr. teach laser structures adapted to dissipate the heat accumulated in the laser rod to reduce the detrimental effects of heat buildup in the apparatus.

In all of these prior art patents the broad objectives are to increase the pumping efficiency by increasing the amount of pumping energy which is transferred to the laser rod, and reducing thermal buildup to enable higher laser output energies. The need for even higher laser output energies and efficiency, compactness, and low failure rates, however, continues to create a need for improved laser structures.

Typically, in single pass pumping schemes, the laser diodes are required to radiate near the absorption peak in the rod to achieve efficient absorption. To accomplish wavelength control of the laser diode radiation, laser diodes with narrow radiation linewidths are typically chosen and their temperature is rigidly controlled by thermoelectric devices. Such temperature control is required since the temperature of the diodes directly affects the radiation wavelength. This greatly adds to the cost of laser diode pumping.

Operating the diode near the peak absorption wavelength of the lasing material and relying upon single pass absorption produces a strong ingredient in the stored energy which is not desirable.

SUMMARY OF THE INVENTION

Broadly, the present invention is a laser apparatus incorporating a laser rod having a longitudinal axis and side and end surfaces. A laser diode cavity encloses the side surfaces of the rod, and the cavity includes heat sink means contiguous with and surrounding the laser rod. Light pumping means comprising a laser diode array is disposed in a spaced relationship with respect to the axis of the rod. A cylindrical lens is disposed between the diode array and the rod. The lens has a focal length and is located to disperse light from the diode array onto the rod. A reflector surrounds the heat sink and is provided with at least one elongated aperture therethrough for passing light from the diode array and lens to the rod and interior of the reflecting cavity. The reflective surface reflects unabsorbed light transmitted through the rod that provides for multiple passes therethrough.

In a specific embodiment of the invention, the reflective surface is a light diffusing surface. In yet another specific embodiment of the invention, a Samarium glass filter is interposed between the laser diode array and the laser rod to suppress transverse parasitic lasing by absorbing the laser wavelength. The lens of the invention is formed in the surface of the Samarium glass filter. The heat sink means may comprise a sapphire envelope connected to the laser rod having a suitable conductive medium such as silicone gel, which is in turn coupled to thermally conductive members. The cooling means may alternately comprise a hollow cavity for passing an operatically transparent cooling fluid over the outer surface of the laser rod.

It is therefore an advantage of the invention to provide laser apparatus having improved energy transfer efficiency between laser pumping diodes and a laser rod. Still another advantage of the invention is to provide laser apparatus which incorporates a lens for spreading the light emitted from the pumping diodes throughout substantially the entire internal volume of the laser rod. Another advantage of the invention is to provide laser apparatus which incorporates a diffusing light reflecting cavity for effecting multiple passes of the pumping light through the laser rod. Yet another advantage of the invention is to provide laser apparatus having reduced sensitivity to the wavelength variations of the diode energy thermal properties and which reduces the thermal sensitivity of the pumping diodes to variations in operating temperatures.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 2:
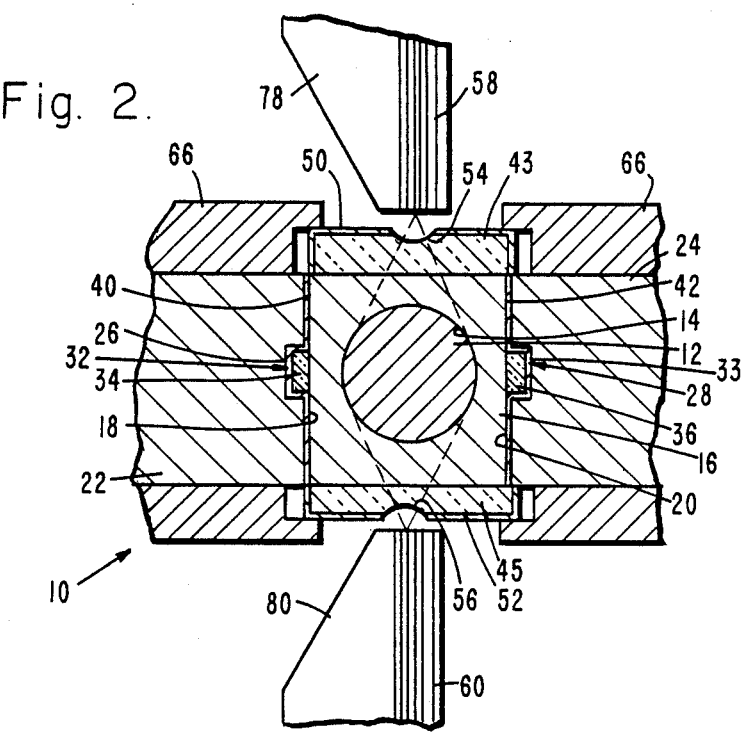
FIG. 2 is an end sectional view of the apparatus of FIG. 1 taken along section line 2—2 of FIG. 1.
Figure 1:
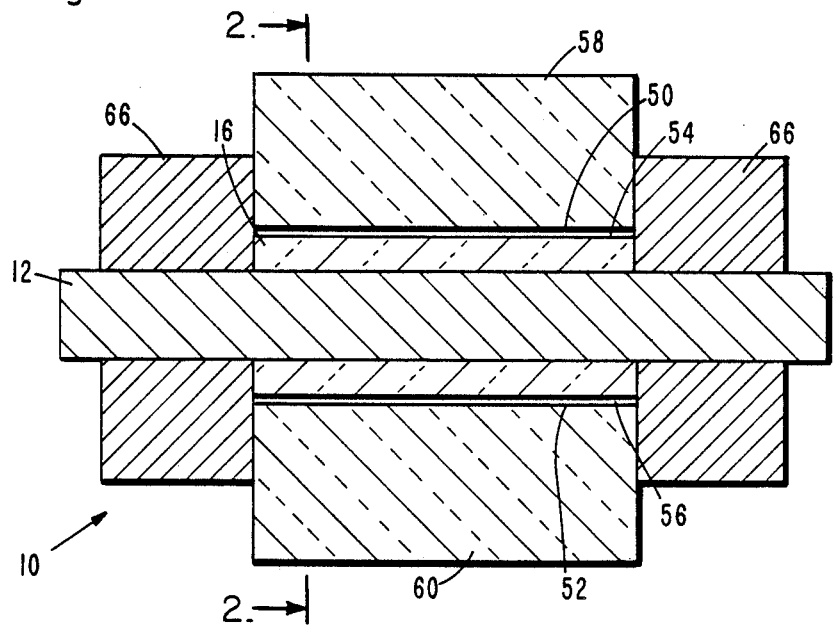
FIG. 1 is an axial sectional view of laser apparatus in accordance with the principles of the present invention.

Referring now to the drawings, FIGS. 1 and 2 show side and end views, respectively, of laser apparatus 10 in accordance with the principles of the present invention. The apparatus 10 comprises an elongated cylindrical laser rod 12, which may be comprised of neodymium-doped yttrium aluminum garnet ($Nd^{+3}YAG$), for example. The laser rod 12 is disposed in a cavity 14 of a sapphire crystal 16. Preferably, the laser rod 12 is coated with a film of silicon gel (not shown) to provide improved thermal conductivity between the laser rod 12 and the sapphire crystal 16.

Lateral surfaces 40, 42 of the crystal 16 are bounded by a pair of thermally conductive support members 22, 24 made of any suitable material such as silver coated aluminum, for example. The lateral surfaces 40, 42 of the crystal 16 are ground with 220 size grit to provide light diffusion. The thermally conductive support members 22, 24 provide a heat sink for the laser rod 12. A pair of longitudinally extending recesses 26, 28 are formed in the inwardly disposed surfaces of the support members 22, 24, respectively. The recesses 26, 28 provide room for the placement of additional Samarium glass filters 34, 36. The inwardly disposed surfaces 18, 20 of the support members 22, 24 are coated with reflecting layers 32, 33 comprising silver, for example.

Upwardly and downwardly disposed surfaces of the crystal 16 (as viewed in the drawing) are bounded by a pair of Samarium glass filters 43, 45. The Samarium glass filters 43, 45 absorb the laser wavelength (1.06 μm for $Nd^{+3}YAG$), and eliminate parasitic transverse lasing which in turn limits the level to which the $Nd^{+3}YAG$ rod can be pumped. Outer surfaces of the filters 43, 45 are also provided with reflecting layers 50, 52, comprising silver, for example. Cylindrical lenses 54, 56 are formed in the filters 43, 45, respectively, the lenses 54, 56 also providing transparent apertures through the reflecting layers 50, 52. A second pair of Samarium glass filters 34, 36 are longitudinally disposed in the inwardly facing sidewalls of the support members. These filters 34, 36 provide the same filtering function as the first pair of filters 43, 45.

A pair of linear laser diode arrays 58, 60 are disposed to emit pumping energy as indicated by the dashed lines in FIG. 2. The positions of the arrays 58, 60, the curvature and spacing of the lenses 54, 56 relative to the axis of the laser rod 12 are selected such that the pumping energy emitted from the diode arrays 58, 60 enters the laser rod 12 at an angle to substantially encompass the diameter thereof. The support members 22, 24, filters 43, 45, laser rod 12 and crystal 16 are enclosed by means of a pair of caps 66, that are made of a suitable material such as silver, for example.

In operation, pumping energy from the diode arrays 58, 60 passes through the lenses 54, 56 which direct the energy throughout the laser rod 12, in such a way as to encompass the full diameter thereof. Energy not absorbed by the laser rod 12 on the first pass therethrough will be reflected by the reflecting layers 32, 33, 50, 52 and caused to again pass through the laser rod 12. Continuous reflection of unabsorbed energy ultimately results in substantially increased absorption of the pumping energy. Heat buildup within the laser rod 12 is substantially diminished by the thermal path provided by the silicon gel (not shown), sapphire crystal 16 and the heat sink members 22, 24. This substantially reduces thermal stresses and other detrimental thermal effects on the laser rod 12. The laser diode arrays 58, 60 typically include large thermally conductive support surfaces 78, 80 which also act as heat sinks that remove heat generated by the laser diodes.

It will further be appreciated that the reflecting surfaces 32, 33, 50, 52 reflect unabsorbed energy back into the laser rod 12 and disperse the reflected energy over a broader section of the laser rod 12 thereby further enhancing efficiency of the laser apparatus 10. The use of a cylindrical laser rod, for example, and the linear diode arrays 58, 60 enables utilization of large diode arrays 58, 60 thereby significantly increasing the amount of energy that can be focused onto the laser rod 12.

More particularly, radiation from the laser diode arrays 58, 60 is spread by the cylindrical lenses 54, 56 etched into the Samarium glass filters 43, 45 to fully encompass the laser rod 12. Radiation not absorbed by the rod 12 on the first pass is reflected by the reflecting layers 32, 33, 50, 52 disposed around the pump cavity. Only the cylindrical lenses 54, 56 are left free of silver to permit transmission of 800 nanometer laser diode pump light. The cooling of the rod 12 is provided by heat conduction through the thin layer of silicone gel, through the sapphire crystal 16 and to the thermally conductive support members 22, 24, acting as heat sinks. All heat sinks employed in the apparatus 10 may be water cooled in a conventional manner to further cool the laser apparatus 10. The Samarium glass filters 43, 45 absorb 1.06 micron radiation emanating from the rod 12 to suppress parasitic cross lasing. The sides of the sapphire crystal 16 are ground to produce diffusion of the pump light, since the particular cavity shape cannot produce diode pump light radiated in a proper specular direction.

Figure 3:
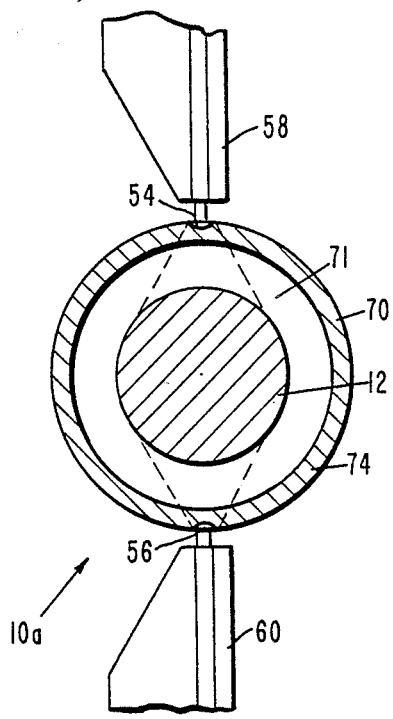
FIG. 3 is an axial sectional view of an alternative embodiment of the invention incorporating fluid cooling of the laser rod.

Referring now to FIG. 3, there is shown an alternative embodiment of laser apparatus 10a in accordance with the invention. The laser rod 12 is disposed concentrically within a cylindrical chamber 71. The chamber 71 has a diameter significantly larger than the diameter laser rod 12 and comprises a Samarium glass tube 70, for example. The chamber 71 permits the flow of cooling fluid (not shown) around the laser rod 12. The cooling fluid may be a suitable liquid or gas, such as water or hydrogen, or the like. The cylindrical lenses 54, 56 are formed in the Samarium glass tube 70. The linear laser diode arrays 58, 60 are disposed outwardly of the lenses 54, 56. Two diode arrays 58, 60 are shown in FIG. 3 for the purposes of illustration, but it is to be understood that many more arrays may be employed around the periphery of the Samarium glass tube 70 as is desired for a particular application. The elements of the laser apparatus 10a are spaced such that the lenses 54, 56 direct pumping energy from the arrays 58, 60 to substantially fill the entire volume of the laser rod 12. The outer surface of the Samarium glass tube 70 is coated with a reflecting and diffusing coating 74 such as barium sulfate which reflects diffusely, or silver which reflects specularly, for example. The Samarium glass tube 70 and reflecting diffusing coating 74 function as discussed above with respect to the laser apparatus 10.

Figure 4:
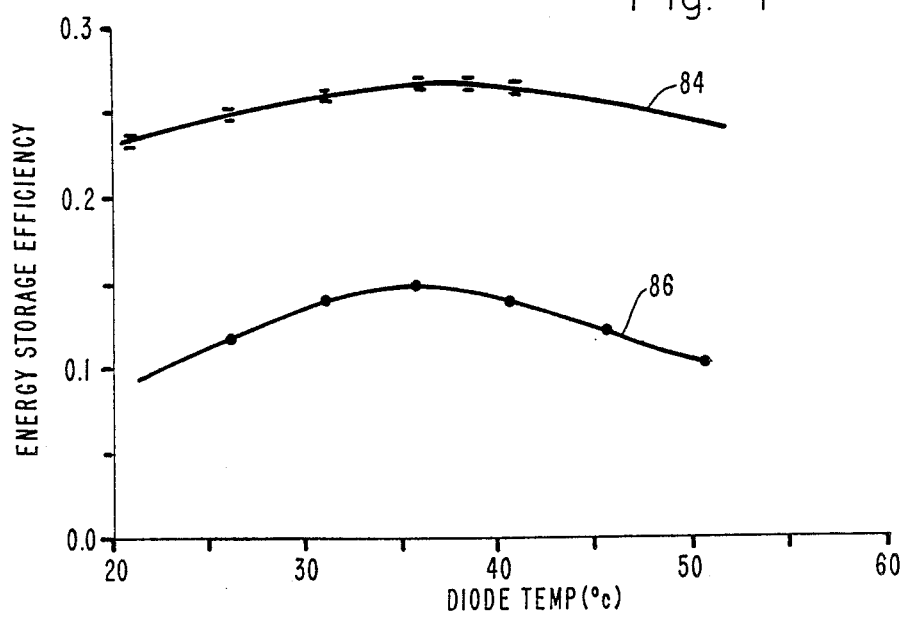
FIG. 4 is a graph illustrating the improved efficiency and thermal characteristics of the invention in comparison to conventional end pumped lasers.

In FIG. 4 there is shown a graph illustrating the relative efficiency and thermal sensitivity of the laser apparatus 10 of the invention shown by line 84, in comparison to the efficiency and diode temperature sensitivity of a conventional single-pass laser assembly, indicated by line 86. From the graph, it will be seen that using the laser apparatus of the present invention, the storage efficiency can be increased nearly 1.8 times over a single pass scheme, and that the efficiency of the laser diode arrays varies significantly less in response to variations to laser diode temperature.

From the above description it will be seen that the laser apparatus of the present invention provides a more uniform stored energy distribution within the laser rod, provides higher energy transfer efficiency and relaxes temperature control requirements for the diodes. In addition, the apparatus is relatively simple in structure and is durable.

It is to be understood that the above-described embodiment is merely illustrative of some of the many specific embodiments which represent applications of the principles of the present invention. Clearly, numerous and other arrangements can be readily devised by those skilled in the art without departing from the scope of the invention. For example, the laser rod may be comprised of neodymium-doped yttrium lithium fluoride ($Nd^{+3}YLF$), which is optimally pumped with polarized light that is polarized transverse to the longitudinal axis of the rod. In this embodiment, the diodes comprising the diode arrays would be oriented orthogonal to the longitudinal axis of the rod in order to provide light that is polarized as stated above. In addition, the disclosed embodiments show two diode arrays employed to pump the laser rod. It is to be understood that in some applications, one diode array may be required, and accordingly, only one lens and filter arrangement would be required.

What is claimed is:

1. Integrating pump cavity laser apparatus comprising:
   a laser rod having a longitudinal axis;
   a pump cavity enclosing the laser rod and comprising heat sink means contiguous with and surrounding the laser rod;
   laser pumping light means disposed in a spaced relationship with the axis of the rod;
   filter means disposed between the pumping light means and the laser rod that comprises lens means having a focal length adapted to focus light emitted from the pumping light means onto the rod; and
   reflecting means surrounding the cavity for reflecting unabsorbed light onto the rod, and having an aperture therein that permits light from the pumping light means to enter into the interior of the cavity.

2. The apparatus of claim 1 wherein the heat sink means includes an elongated sapphire structure having a cavity therein adapted to contiguously receive the laser rod.

3. The apparatus of claim 2 further comprising a film of silicon gel interposed between the sapphire structure and the laser rod.

4. The apparatus of claim 3 wherein the laser pumping light means comprises at least two laser diode arrays and at least two filter means, and wherein the diode arrays and filter means are disposed in a opposed relationship with respect to the laser rod.

5. The apparatus of claim 1 wherein the filter means further comprises Samarium glass filter means disposed between the pumping light means and the laser rod for absorbing radiation emanating from the laser rod.

6. The apparatus of claim 8 wherein the Samarium glass filter means includes an elongated Samarium glass plate disposed adjacent the laser pumping light means and disposed substantially parallel to the axis of the laser rod, and having the lens means formed therein.

7. The apparatus of claim 6 wherein the laser pumping light means comprises at least two laser diode arrays and at least two lens means, and wherein the diode arrays and lens means are disposed in a diametrically opposed relationship with respect to the laser rod.

8. The apparatus of claim 7 wherein the light emitting diode arrays comprise laser diodes.

9. The apparatus of claim 8 wherein the laser rod is comprised of neodymium-doped yttrium aluminum garnet.

10. The apparatus of claim 8 wherein the laser rod is comprised of neodymium-doped ytrium lithium fluoride.

11. Integrating pump cavity laser apparatus comprising:
   an enclosure;
   a laser rod;
   a pump cavity disposed within the enclosure enclosing the laser rod and comprising heat sink means thermally coupled to the laser rod;
   at least one laser diode array disposed adjacent to the rod;
   Samarium glass filter means disposed between the laser array and the laser rod for absorbing radiation emanating from the laser rod;
   lens means disposed between the laser diode array and the laser rod for focusing light onto the rod; and
   reflecting means substantially surrounding the cavity for reflecting light that is unabsorbed by the rod, the reflecting means having at least one aperture therein that permits light from the laser diode array to enter into the cavity.

12. The apparatus of claim 11 wherein the heat sink means includes an elongated sapphire structure having a cavity therein adapted to contiguously receive the laser rod.

13. The apparatus of claim 12 further comprising a film of silicon gel interposed between the sapphire structure and the laser rod.

14. The apparatus of claim 11 wherein the laser rod is comprised of neodymium-doped yttrium aluminum garnet.

15. Integrating pump cavity laser apparatus comprising:
   an elongated laser rod having a longitudinal axis;
   a laser diode pump cavity enclosing the laser rod;
   a sapphire crystal heat sink disposed in the cavity and having a bore complimentary to the laser rod, and having the laser rod disposed in the bore substantially contiguous with the wall of the bore;
   a pair of linear laser diode arrays diametrically disposed in a spaced relationship to the axis of the laser rod;
   a Samarium glass filter disposed between each of the arrays and the laser rod;
   the interior of the pump cavity and the outer surfaces of the filters comprising a reflective light diffusing surface; and
   a lens formed in each of the filters, each lens forming an optical aperture through the reflective light diffusing surface that is adapted to focus light emitted from the arrays onto the laser rod.

16. The apparatus of claim 15 wherein the laser rod is comprised of neodymium-doped yttrium aluminum garnet.

17. The apparatus of claim 15 wherein the laser rod is comprised of neodymium-doped yttrium lithium fluoride.

18. The apparatus of claim 11 wherein the heat sink means comprises a cooling cavity disposed between the laser rod and the pump cavity that is adapted to pass optically transparent cooling fluid therethrough.

19. Integrating pump cavity laser apparatus comprising:
   an elongated laser rod having a longitudinal axis;
   a cooling cavity surrounding the laser rod;
   an enclosure comprising a reflective light diffusing surface surrounding the laser rod and the cooling cavity;
   heat transferring fluid disposed in the cooling between the laser rod and the crystal;
   at least one laser diode array disposed outside the enclosure; and
   a lens formed in the enclosure that forms an aperture therethrough that is adapted to focus light emitted from the array onto the laser rod.

20. The apparatus of claim 19 wherein the cooling cavity is adapted to pass optically transparent cooling fluid therethrough.

21. The apparatus of claim 19 which comprises at least two laser diode arrays and at least two lenses, and wherein the diode arrays and lenses are disposed in a diametrically opposed relationship with respect to the laser rod.

* * * * *

UNITED STATES PATENT AND TRADEMARK OFFICE
CERTIFICATE OF CORRECTION

PATENT NO. : 4,969,155
DATED : November 6, 1990
INVENTOR(S) : Osher Kahan

It is certified that error appears in the above-identified patent and that said Letters Patent is hereby corrected as shown below:

Column 5, line 40, Claim 6, change "8" to --5--.

Column 5, line 67, Claim 11, after laser (first occurrence), insert --diode--.

Signed and Sealed this

Nineteenth Day of May, 1992

Attest:

DOUGLAS B. COMER

*Attesting Officer*  *Acting Commissioner of Patents and Trademarks*